United States Patent
Shibuya et al.

[11] Patent Number: 6,049,840
[45] Date of Patent: Apr. 11, 2000

[54] SYSTEM FOR PROVIDING AN INTERROGATING HOST WITH INFORMATION INCLUDING START-UP PROCESSING STATUS OF A PERIPHERAL DEVICE STORED IN STORING MEANS

[75] Inventors: Akiko Shibuya, Sagamihara; Tsuneo Imai, Ebina, both of Japan

[73] Assignee: Hitachi, Ltd., Tokyo, Japan

[21] Appl. No.: 08/913,690

[22] PCT Filed: Mar. 20, 1995

[86] PCT No.: PCT/JP95/00504

§ 371 Date: Jan. 28, 1998

§ 102(e) Date: Jan. 28, 1998

[87] PCT Pub. No.: WO96/29654

PCT Pub. Date: Sep. 26, 1996

[51] Int. Cl.[7] .................................................. G06F 13/14
[52] U.S. Cl. ........................ 710/5; 710/62; 710/72; 710/74
[58] Field of Search .................... 710/5, 62, 72, 710/74

[56] References Cited

U.S. PATENT DOCUMENTS

| | | | |
|---|---|---|---|
| 4,393,459 | 7/1983 | Huntley et al. | 364/900 |
| 5,659,801 | 8/1997 | Kopsaftis | 395/825 |
| 5,737,757 | 4/1998 | Hassoun et al. | 711/145 |
| 5,809,521 | 9/1998 | Steinmetz | 711/116 |
| 5,826,103 | 10/1998 | Whittaker | 395/828 |

Primary Examiner—Thomas C. Lee
Assistant Examiner—Abdelmoniem Elamin
Attorney, Agent, or Firm—Antonelli, Terry, Stout & Kraus, LLP

[57] ABSTRACT

An interface control system overcomes deficiencies of by adopting a structure comprising host computers connected with peripheral devices, each host computer including a start-up status recognition unit and each peripheral device having a start-up status notification unit. The start-up status recognition unit receives information about start-up processing progress status of a peripheral device of interest, and peripheral device information including identification information about a parent device causing the peripheral device to perform start-up processing. The peripheral device information is transmitted to host computers by the start-up status notification unit of each peripheral device. Before a host computer causes a peripheral device to perform start-up processing, the start-up status recognition unit of the host recognizes the start-up status of the peripheral device in question on the basis of the received start-up processing status information and peripheral device information. Knowing the peripheral device start-up status allows the host computer to determine the necessity of starting up the peripheral device in question, whereby unnecessary start-up processing is averted and the efficiency of system operation is enhanced.

20 Claims, 6 Drawing Sheets

FIG.6

| START-UP STATUS | PARENT DEVICE |
|---|---|
| YET TO BE STARTED UP (00) | — |
| START-UP IN PROGRESS (01) | A |
| START-UP COMPLETE (11) | A | ns a single controller 34 may control a plurality of units connected thereto.

SYSTEM FOR PROVIDING AN INTERROGATING HOST WITH INFORMATION INCLUDING START-UP PROCESSING STATUS OF A PERIPHERAL DEVICE STORED IN STORING MEANS

BACKGROUND OF THE INVENTION

The present invention relates to an interface control system for use with an information processing system having a bidirectionally communicable interface interconnecting a plurality of host computers and a peripheral device, such as a printer. More particularly, the invention relates to an interface control system for reliably starting up appropriate peripheral devices while leaving unnecessary peripherals inactive, whereby the efficiency of system operation is enhanced.

A conventional information processing system of the type outlined above will now be described. FIG. 3 is a schematic diagram showing a typical example of a conventional information processing system. In FIG. 3, the system includes host computers 31, host adapters 32, for an I/O bus 33, peripheral devices 36 (e.g., printer), a controller 34 controlling the peripheral devices 36, and units 35 (e.g., printer engine) controlled by the controller 34. A single controller 34 may control a plurality of units connected thereto.

The I/O bus 33 is a bidirectionally communicable bus generally connected with devices each having a parent or child function. A parent function device (called a parent device hereunder) is a device that acquires the right to use the I/O bus and causes another device connected with the I/O bus to operate. A child function device (called a child device hereunder) is a device that performs the operation required by the parent device. Generally, host computers act as parent devices and peripheral devices assume the role of child devices. Sometimes a peripheral device may also act as a parent device.

FIG. 4 is a schematic diagram outlining an example of the operation of a conventional interface control system. What is shown in FIG. 4 is a sequence of interface control processing steps carried out after a device on the I/O bus is switched on or after a peripheral device has been reset.

With a peripheral device reset or switched on (401), a host computer issues a command (402) requesting the peripheral device to report information about itself (e.g., the type of the device and the presence or absence of data to be downloaded). The information allows the host computer to identify the peripheral device connected to the I/O bus. In response to such a command, the peripheral device sends return data (403). The host computer then transmits to the peripheral device a command for executing start-up processing (404). The peripheral device performs start-up processing (405). If there is no interruption, such as a command reception from another parent device (406a), the peripheral device terminates start-up processing (407) and notifies the host computer of the end of start-up processing (408). This completes the whole start-up processing. The procedure made of the above series of steps prepares the host computer to proceed with an ordinary process such as printing (409). The conventional technique above is described illustratively in Japanese Patent Laid-Open No. Hei 5-165588.

In the above procedure, there may occur an interruption (406b) in which the peripheral device has its ongoing start-up processing interrupted upon receipt of a command from another host computer connected to the I/O bus. Such an interruption foils the start-up processing of the peripheral, which is reset individually at that point (410). The peripheral device then enters a standby state (411) to wait for commands from a host computer (i.e., a command requesting information about the peripheral device, a command for executing start-up processing). This means that start-up processing carried out so far is wasted. The host computer must call on the peripheral device again to perform start-up processing. Thus, it takes more time than should be necessary to carry out start-up processing.

The bottleneck above is circumvented conventionally by one of two measures: using either a changeover switch attached to the I/O bus to prevent any noncommunicative device from interfering with other sequences on the I/O bus, or software for automatically switching the right to use the I/O bus between devices. However, these measures are time-consuming and not practical because they require the two devices concerned to communicate with each other through a different medium.

DISCLOSURE OF INVENTION

It is therefore an object of the present invention to bypass the above and other bottlenecks and to provide an interface control system for allowing an information processing system to eliminate the wasted phase of start-up processing of peripheral devices for more efficient system operation.

In carrying out the invention, and according to one aspect thereof, there is provided an interface control system for use with an information processing system constituted by a bidirectionally communicable bus, a peripheral device connected to the bus, and a host computer connected to the bus for designating start-up processing of the peripheral device, the peripheral device comprising: storage means for storing peripheral device information including the start-up processing status of the peripheral device; and transmission means for transmitting the peripheral device information to the host computer in response to a request by the host computer; wherein the host computer verifies the start-up processing status of the peripheral device on the basis of the peripheral device information received from the peripheral device.

In the above structure, the peripheral device is made to retain information about its start-up status and to transmit the information to the host computer at the request of the latter. Given the information, the host computer grasps the start-up status of the peripheral device. This allows the host computer to issue normal processing requests and other commands, such as a start-up processing request as needed.

Preferably, where a plurality of host computers are connected to the bus, the peripheral device may hold in the storage means peripheral device information including an identifier identifying a host computer which has issued a start-up processing request to the peripheral device. A host computer may receive the peripheral device information and use it to verify whether the host computer designating start-up processing of the peripheral device is its own host computer or another host. This structure allows host computers to proceed with their operation according to the situation and to see if the peripheral device of interest has completed or has yet to perform start-up processing.

In another preferred structure of the invention, the host computer may issue an information request command to request the peripheral device information before issuing a start-up processing request command to the peripheral device. This allows the host computer to issue another start-up processing command or to desist from issuing one according to the content of the peripheral device information, whereby execution of wasteful start-up processing is averted. (That is, the host computer may issue a start-up processing request command when the peripheral device has yet to perform start-up processing, and may refrain from issuing that command when the peripheral device has completed start-up processing or is executing it normally.)

If the peripheral device is executing start-up processing abnormally or has completed it erroneously (i.e., where the host computer does not or cannot recognize whether or not the peripheral device has started up), then the host computer may reset the peripheral device before starting it up again. This makes it easy for the system to recover from its abnormal state.

As outlined above, the inventive system overcomes deficiencies of the prior art by adopting a structure comprising host computers connected with peripheral devices, each host computer including start-up status recognition means and each peripheral device having start-up status notification means. The start-up status recognition means receives information about start-up processing progress status of a peripheral device of interest and peripheral device information including identification information about a parent device causing the peripheral device to perform start-up processing. The peripheral device information is transmitted to host computers by the start-up status notification means of each peripheral device. Before a host computer causes a peripheral device to perform start-up processing, the start-up status recognition means of the host recognizes the start-up status of the peripheral device in question on the basis of the received start-up processing status information and peripheral device information. Knowing the peripheral device start-up status allows the host computer to determine whether it is necessary to start up the peripheral device in question, whereby unnecessary start-up processing is averted and the efficiency of system operation is enhanced.

BRIEF DESCRIPTION OF DRAWINGS

FIG. 6 is a table that lists peripheral device information held by a peripheral device.

BEST MODE FOR CARRYING OUT THE INVENTION

Figure 1:
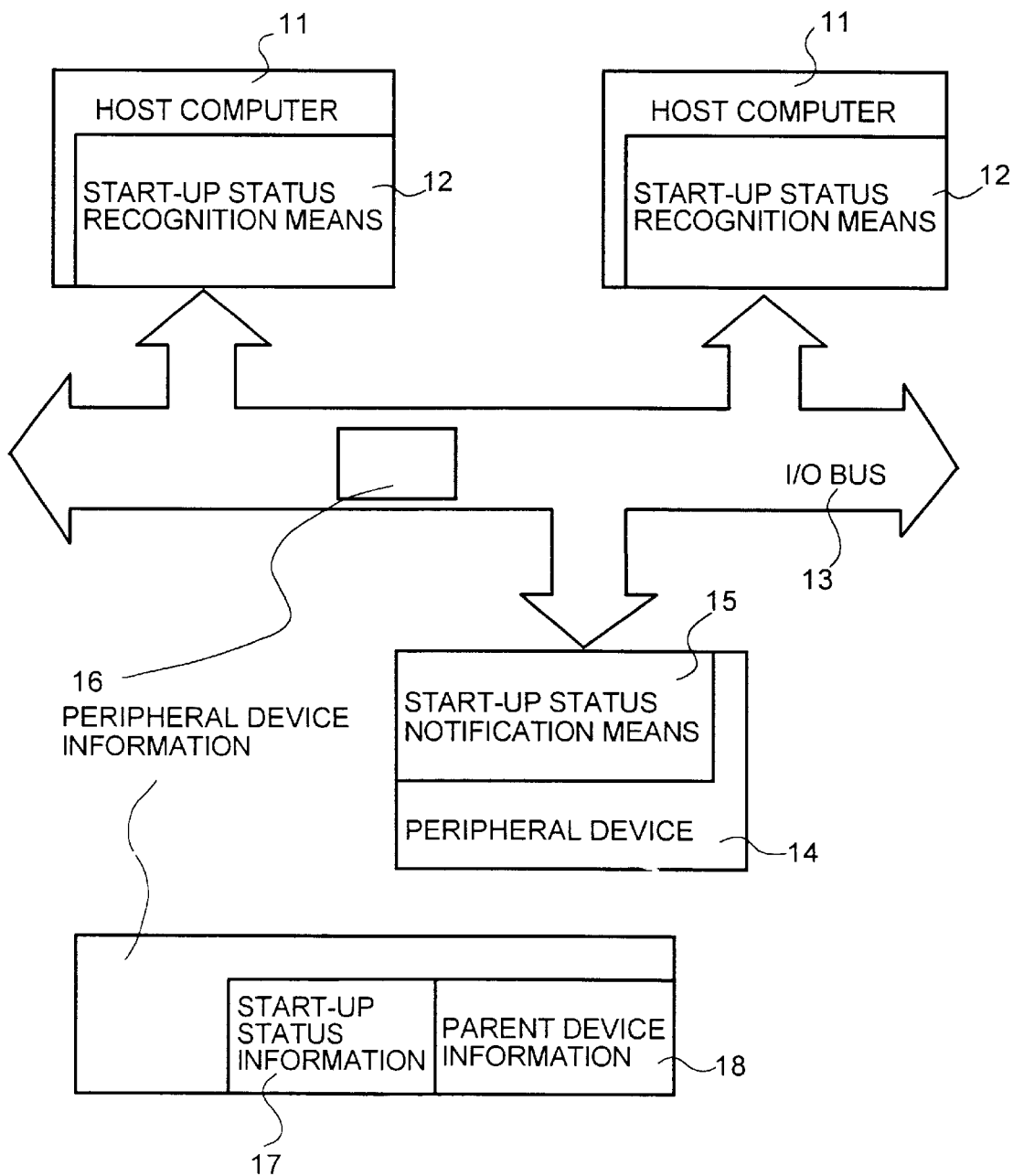
FIG. 1 is a block diagram of an embodiment of the invention.
Figure 5:
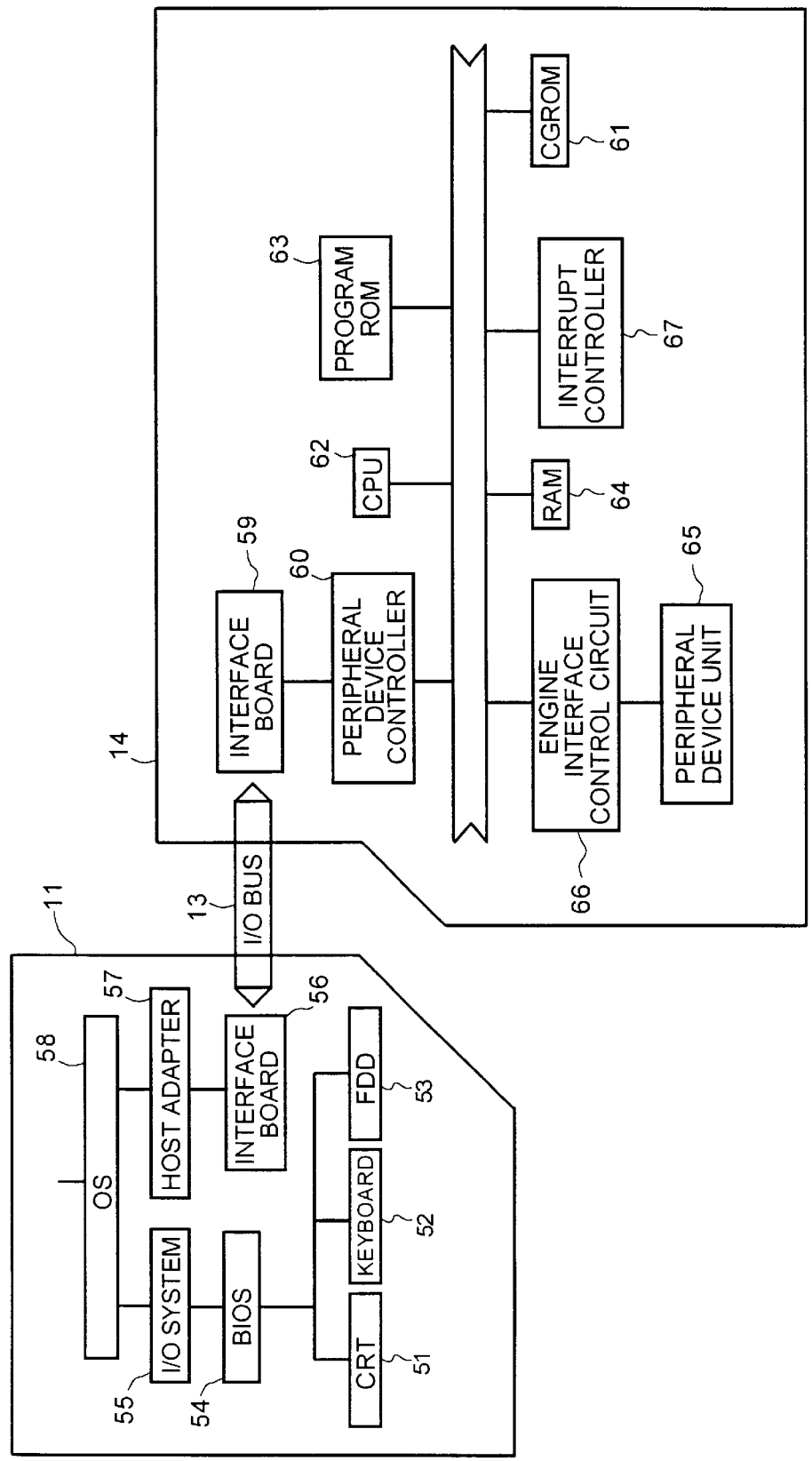
FIG. 5 is a more detailed block diagram of the embodiment of the invention.

An interface control system in an information processing system embodying the invention will now be described in detail with reference to the accompanying drawings. FIG. 1 is a block diagram of the information processing system embodying the invention, and FIG. 5 is a more detailed block diagram of the embodiment.

In FIG. 1, the system includes a host computer 11 having a parent function; start-up status recognition means 12 in the host computer 11; an I/O bus 13; a peripheral device 14 having a child function; and start-up status notification means 15 in the peripheral device 14.

The parent device is a device that acquires the right to use the I/O bus 13 and requests another device connected with the I/O bus 13 to operate. The child device is a device that performs the operation requested by a parent device.

The peripheral device information 16 which flows on the I/O bus 13, includes start-up status information 17 and parent device information 18. The start-up status information 17 indicates the start-up processing progress status of the peripheral device that originated the information. The parent device information 18 identifies the parent device causing the peripheral device in question to perform start-up processing.

The I/O bus 13 is a bidirectionally communicable bus. This may be an SCSI (Small Computer System Interface) bus based on the SCSI-2 interface.

The start-up status notification means 15 in each peripheral device 14 transmits peripheral device information 16 to a host computer 11. Illustratively in response to a command from the host computer 11, the start-up status notification means 15 transmits return data supplemented with the peripheral device information 16 to the host.

The start-up status recognition means 12 in each host computer 11 recognizes the start-up processing progress status of the peripheral device 14 and identifies the parent device causing the peripheral device 14 to perform start-up processing. Recognition of the status and identification of the parent device are accomplished on the basis of the start-up status information 17 and parent device information 18 included in the peripheral device information 16. The peripheral device information 16 is contained in the return data sent from the peripheral device 14.

FIG. 5 is a more detailed block diagram of the information processing system in FIG. 1. The host computer 11 is interfaced with its user through a CRT 51 for output of information, a keyboard 52 for input of information, an FDD 53 serving as external storage, a BIOS (Basic Input-Output System) 54 for controlling the FDD, keyboard and CRT; an I/O system 55, an interface board 56 connected with the I/O bus 13, a host adapter 57, an OS 58 for controlling these components, and internal memory.

The peripheral device 14 comprises an interface board 59 connected to the I/O bus 13, a peripheral device controller 60 for controlling connections between the interface board 59 and other devices connected to the I/O bus 13, a CGROM 61 holding character fonts and other data, a CPU 62 for controlling the peripheral device in question, a program ROM 63 holding programs for controlling the peripheral device, a RAM 64 acting as a work memory, a peripheral device unit 65 for executing an actual (print) operation, an engine interface control circuit 66 for controlling the unit 65, and an interrupt controller 67 for controlling interrupt signals.

The start-up status notification means 15 mentioned above corresponds to the programs held in the program ROM 63 and the CPU 62 operating on the programs of the peripheral device 14.

The start-up status recognition means 12 also described above corresponds to the OS 58 in the host computer 11.

Figure 2:
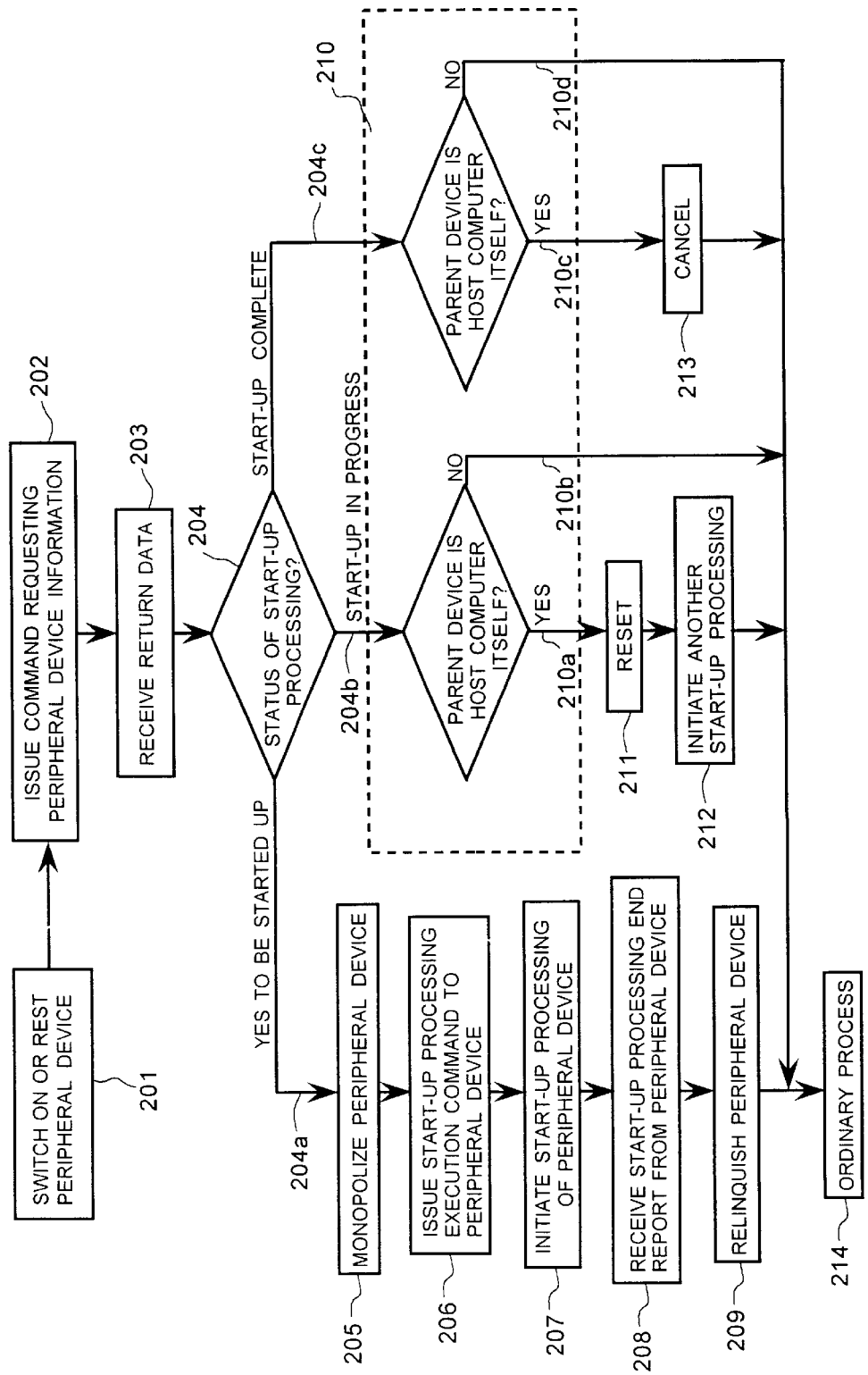
FIG. 2 is a flowchart of steps in which a parent device of the embodiment operates.
Figure 3:
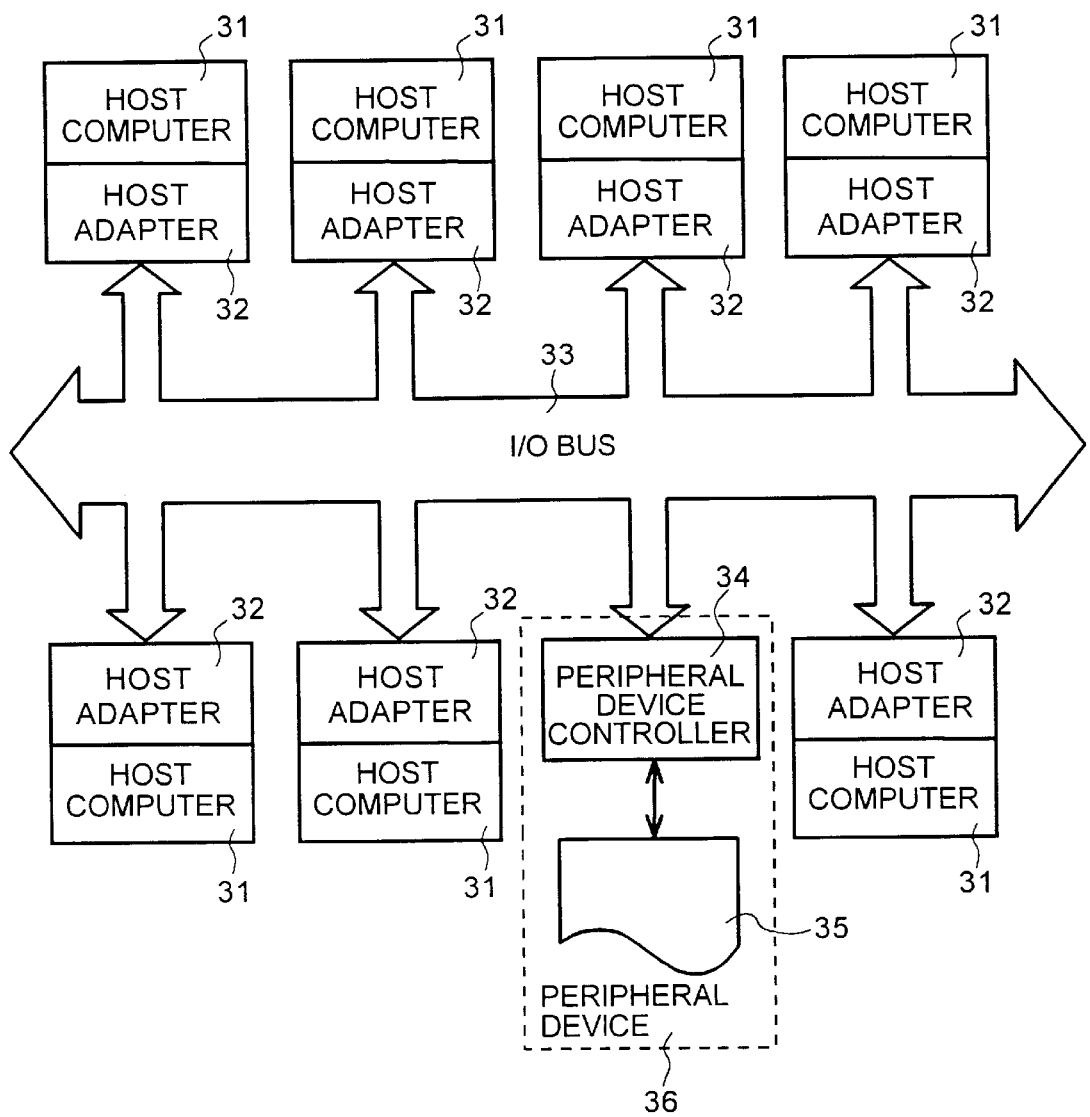
FIG. 3 is a block diagram showing a typical example of a conventional information processing system.

FIG. 2 is a flowchart of steps in which the host computer 11 causes the peripheral device 14 to perform start-up processing. With the peripheral device 14 switched on or reset (step 201), the host computer 11 issues a command requesting peripheral device information 16 (step 202) from the peripheral device before operation of the latter. In response to the command, the peripheral device 14 sends back to the host computer 11 return data including peripheral device information (step 203).

The host computer 11 interprets the start-up status information 17 about the peripheral device 14 included in the peripheral device information, thereby recognizing the startup processing progress status of the peripheral device 14 (step 204). If no host computer has yet to request the peripheral device 14 to perform start-up processing (step 204*a*), the host computer 11 monopolizes the peripheral device 14 to protect the interface therewith from interference by any other device (step 205). The host computer then issues a start-up processing execution command to the peripheral device (step 206), thus initiating start-up processing of the peripheral device (step 207). Upon receipt of a start-up processing end report from the peripheral device (step 208), the host computer relinquishes the peripheral device (step 209) so that any other device connected with the I/O bus may use it.

If the host computer recognizes from the start-up status information that the peripheral device is currently executing start-up processing (step 204*b*), the host computer in question checks the parent device information 18 in the peripheral device information to see which host computer is causing the peripheral device to perform start-up processing. If the parent device starting up the peripheral device is not that host computer (210*b*), the host computer waits for the peripheral device to terminate start-up processing normally, and then issues instructions such as a command to the peripheral device (step 214).

In the process above, the host computer using its start-up status recognition means checks the start-up status information to recognize the start-up status of the peripheral device. This allows the host computer to use the peripheral device without causing it to perform superfluous start-up processing.

If the host computer finds from the parent device information that it is the parent device causing the peripheral device to execute start-up processing (step 210*a*), that means one of two things: either the host computer went down while starting up the peripheral device, or the peripheral device was stopped halfway by an interruption while starting up. In either case, the host computer is unable to grasp precisely the progress status of start-up processing of the peripheral device. In such cases, the host computer issues a reset instruction to the peripheral device to nullify the latter's start-up processing carried out so far (step 211). Given the reset instruction, the peripheral device performs reset processing such as removal and reapplication of power. Thereafter, the host computer in question initiates another start-up processing of the peripheral device so that any of the host computers connected to the I/O bus, including that host computer, may use the peripheral device (step 212).

If the start-up status information has led the host computer to conclude that the peripheral device has completed start-up processing (step 204*c*), the host computer referencing the parent device information 18 included in the peripheral device information identifies the parent function-equipped host computer which is causing the peripheral device to perform start-up processing (step 210). If the parent device causing the peripheral device to execute start-up processing is not that host computer (step 210*d*), the host computer in question may issue instructions such as a command to the peripheral device (step 214). If the parent device information has led the host computer to conclude that it is the parent device (step 210*c*), that means the host computer went down while using the peripheral device. The peripheral device may operate unpredictably in response to the command currently in effect. Thus, the host computer cancels the currently issued command (step 213), and again issues a print or other normal processing command to the peripheral device (step 214).

What follows is a description of how a host computer issues an inquiry command in order to recognize the start-up status of a peripheral device, with an SCSI-2 type I/O bus in use. Before issuing a command, the host computer enters an arbitration phase to acquire the right to use the SCSI bus. Then, going into a selection phase, the host computer verifies the peripheral device and SCSI ID to establish the SCSI interface.

In the process described above, the peripheral device holds in its RAM the received SCSI ID of the host computer until one command sequence comes to an end.

The peripheral device initiates its start-up processing upon receipt of a start-up command. Start-up processing is a procedure by which a peripheral device downloads from a host computer character fonts and a control program for use with the device.

As shown in FIG. 6, the peripheral device has a flag set in its RAM to indicate its start-up status. When switched on or reset, the peripheral device sets the flag to "00" (yet to be started up). When start-up processing is initiated, the peripheral device sets the start-up status flag to "01." The flag thus set indicates that the peripheral device is currently executing start-up processing (start-up in progress). Upon normal completion of start-up processing, the peripheral device sets the flag to "11" indicating that start-up processing has ended (start-up complete).

Until processing of the start-up command is terminated, the peripheral device keeps in its RAM that SCSI ID of the parent device which was received in the selection phase at command reception time.

Upon receipt of an inquiry command from a host computer, the peripheral device reads from its RAM the above-described flag and the SCSI ID of the parent device. The two items of information, are added to return data as start-up status information, and parent device information respectively. The return data thus prepared is sent back to the host computer in response to the inquiry command.

Figure 4:
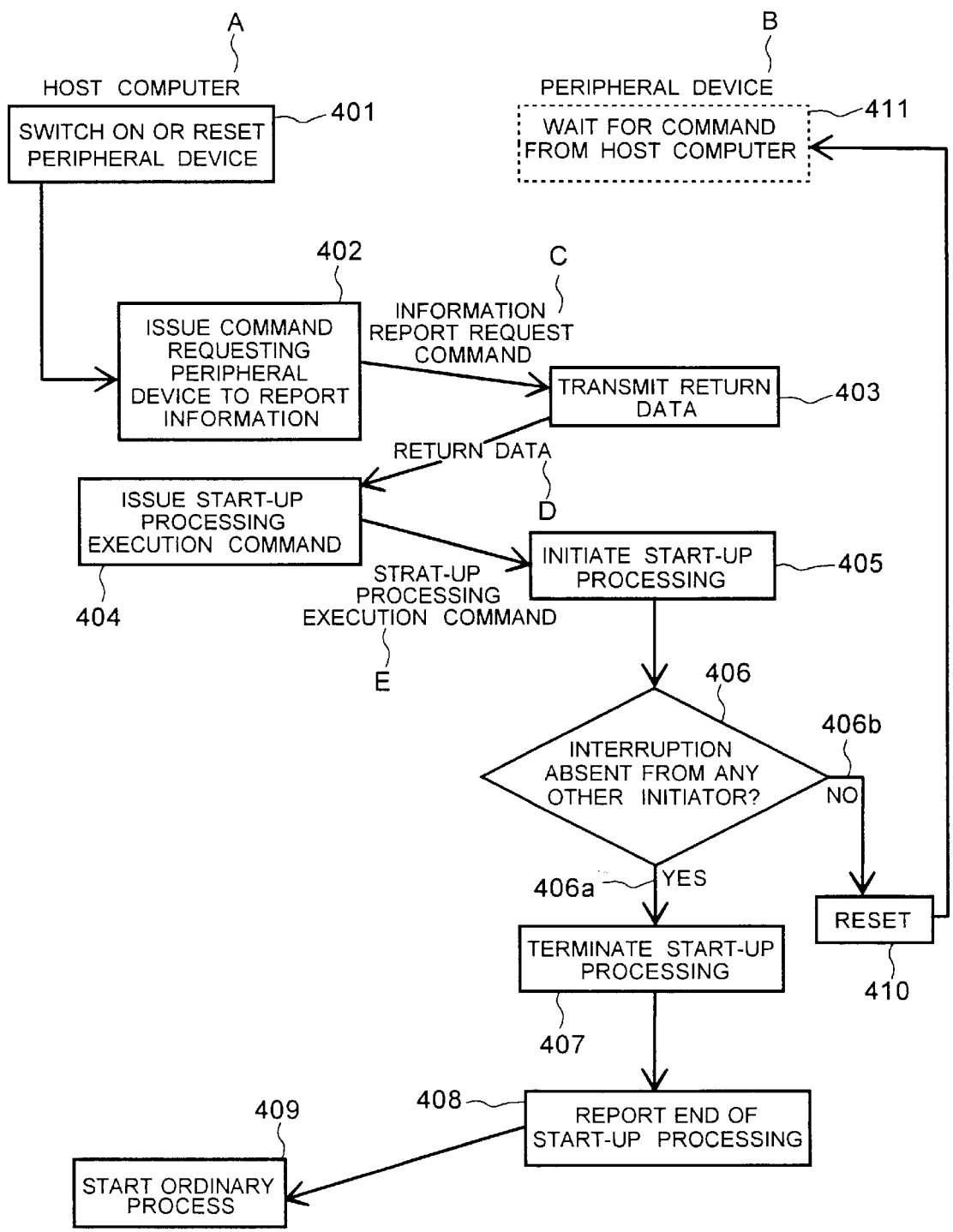
FIG. 4 is a functional diagram outlining operations in a conventional interface control system.

As described in conjunction with FIG. 4, the host computer referencing the peripheral device start-up status information in the return data determines whether or not the peripheral device needs to be started up. The host computer proceeds with its operation differently depending on the result of such determination.

In the embodiment described above, the return data to be sent back in response to the inquiry command is supplemented with start-up status information and parent device information. Alternatively, the two items of information may be transmitted separately in any sequence.

As described, the embodiment of the invention allows interface control to be effected in a smooth manner. Referencing parent device information, each host computer is capable of recognizing the parent device that is currently causing a given peripheral device to perform start-up processing. The inventive system prevents any one host computer from monopolizing a peripheral device continuously and keeps a plurality of host computers from getting into contention or a deadlocked state. These features enhance the efficiency of system operation.

Conventionally, if any error occurs in a peripheral device during start-up processing, the peripheral device reports the error to host computers. With the above embodiment, each peripheral device retains during its start-up processing the SCSI ID of the parent device having requested the peripheral device in question to execute start-up processing. This means that the peripheral device, having developed an error, can identify the parent device to which to report the error.

The inventive system permits smooth execution of communication between the configured devices without the use of a specialized I/O bus controller or software. That is, the system is operated in a simplified and efficient manner with no increase in load on its devices.

As described, the invention boosts the operative efficiency of an information processing system comprising host computers, such as personal computers and workstations, connected to peripheral devices, such as a printer, through interface arrangements constituting illustratively the SCSI interface. The inventive system permits smooth communication between the configured devices without resorting to a special I/O bus controller or software. The system is operated in a simple and efficient manner with no increase in load on the devices making up the system. The invention thus provides significant improvements in the fabrication and operation of information processing systems.

We claim:

1. An interface control system for use with an information processing system constituted by a bidirectionally communicable bus, a peripheral device connected to the bus, and a host computer connected to said bus for designating start-up processing of said peripheral device, said peripheral device comprising:

storage means for storing peripheral device information including the start-up processing status of said peripheral device; and transmission means for transmitting said peripheral device information to said host computer in response to a request by said host computer;

wherein said host computer verifies the start-up processing status of said peripheral device on the basis of said peripheral device information received from said peripheral device.

2. An interface control system according to claim 1, further comprising a plurality of host computers connected to said bus;

wherein said peripheral device holds in said storage means said peripheral device information including an identifier identifying a host computer having issued a start-up processing request to said peripheral device, said host computer using said peripheral device information as a basis for identifying the host computer designating start-up processing of said peripheral device.

3. An interface control system according to claim 2, wherein said host computer issues an information request command to request said peripheral device information before issuing a start-up processing request command to said peripheral device, and wherein said peripheral device includes said peripheral device information in return data transmitted in response to said information request command.

4. An interface control system according to claim 3, wherein said host computer issues a start-up processing request if said peripheral device has yet to perform start-up processing.

5. An interface control system according to claim 3, wherein, if said peripheral device is either performing or has completed start-up processing, said host computer checks to see if the host computer issuing said start-up processing request command is said host computer, said host computer further desisting from issuing a start-up processing request command if the host computer issuing said start-up processing request command is not said host computer.

6. An interface control system according to claim 3, wherein, if said peripheral device is performing start-up processing and if the host computer issuing said start-up processing request command is said host computer, said host computer resets said peripheral device and thereafter issues a start-up processing request command.

7. An interface control system according to claim 6, wherein said bus is an SCSI-2 bus and the peripheral device information request command is an inquiry command.

8. An interface control system for use with an information processing system constituted by a bidirectionally communicable bus, a peripheral device connected to the bus, and a host computer connected to said bus for designating start-up processing of said peripheral device, wherein:

said peripheral device comprises storage means for storing start-up status information indicating a start-up processing status of said peripheral device;

when initiating start-up processing upon receipt of a start-up processing request from said host computer, said peripheral device sets said start-up status information to indicate a start-up processing which is in progress, said peripheral device further setting, upon completion of start-up processing, said start-up status information to indicate the completion of start-up processing; and said peripheral device transmits said start-up status information in response to said host computer.

9. An interface control system according to claim 8, further comprising a plurality of host computers connected to said bus, wherein:

said peripheral device holds an identifier identifying the host computer which has issued said start-up processing request; and said peripheral device outputs said identifier in response to a request from said host computer.

10. An interface control system according to claim 9, wherein said bus is Small Computer System Interface (SCSI) bus and said identifier is an SCSI identification (ID) received from a host computer during a selection phase.

11. An interface control system according to claim 10, wherein said host computer issues an information request command to request said peripheral device information before issuing said start-up processing request to said peripheral device, and wherein said peripheral device has said peripheral device information included in return data transmitted in response to said information request command.

12. A start-up processing method for a host computer to start up a peripheral device connected to said host computer via a bidirectionally communicable bus, said start-up processing method comprising the steps of:

issuing a peripheral device status verification request to said peripheral device before issuing a start-up processing request to said peripheral device;

analyzing start-up status identification information included in return data transmitted from said peripheral device in response to the verification request, said start-up status identification information included in said return data indicating the status of start-up processing execution of said peripheral device;

issuing another start-up request to said peripheral device if said peripheral device has yet to execute startup processing; and suppressing the issue of a start-up processing request if said peripheral device has completed the start-up processing.

13. A start-up processing method according to claim 12, wherein said return data includes parent device identification information for identifying a host computer which has issued a start-up processing request, said start-up processing method further comprising the steps of:

if said analyzing step finds that said peripheral device is performing the start-up processing, determining if the host computer which has issued the start-up processing request is said host computer;

if the host computer which has issued the start-up processing request is said host computer, resetting said peripheral device before issuing a start-up processing request; and if the host computer which has issued the start-up processing request is not said host computer, suppressing the issue of a start-up processing request.

14. A start-up processing method for host computers to start up a peripheral device connected to said host computers via a bidirectionally communicable bus, said peripheral device including storage means for storing both start-up status information indicating a start-up processing status of said peripheral device and parent device information identifying a host computer having issued a start-up processing request to said peripheral device, said start-up processing method comprising the steps of:

upon receipt of a start-up processing request from a host computer, initiating start-up processing by storing an identifier of the host computer as said parent device information into said storage means;

changing said start-up status information in accordance with progress in start-up processing; and upon receipt of a start-up status verification request from said host computer to said peripheral device, retrieving said start-up status information and said parent device information from said storage means for transmission back to said host computer.

15. A host computer connected to a peripheral device via a bidirectionally communicable bus and capable of starting up said peripheral device, said host computer comprising:

request issuance means for issuing a status verification request to said peripheral device before issuing a start-up processing request to said peripheral device;

analysis means for analyzing start-up status identification information included in return data transmitted from said peripheral device in response to said status verification request, said start-up status identification information indicating the status of start-up processing execution of said peripheral device, wherein:

if said peripheral device has yet to perform start-up processing, said host computer issues another start-up request to said peripheral device; and if said peripheral device has completed start-up processing, said host computer suppresses the issue of any start-up processing request.

16. A host computer according to claim 15, wherein said return data further includes parent device identification information identifying the host computer which has issued said start-up processing request, said host computer further comprising:

judgment means for judging, when analysis by said analysis means reveals that said peripheral device is performing start-up processing, whether the host computer which has issued said start-up processing request is said host computer; and request issuance means for issuing, when judgment by said judgment means shows that the host computer which has issued said start-up processing request is said host computer, said start-up processing request after resetting said peripheral device, said request issuance means further suppressing the issue of a start-up processing request when judgment by said judgment means reveals that the host computer which has issued said start-up processing request is not said host computer.

17. A peripheral device connected to a host computer via a bidirectionally communicable bus, said peripheral device comprising:

storage means for storing both start-up status information indicating start-up processing status of said peripheral device and parent device information identifying a host computer which has issued a start-up processing request to said peripheral device;

start-up initiation means acting when a start-up processing request is received from a host computer, said start-up initiation means thereupon initiating start-up processing by storing an identifier of the host computer into said storage means as said parent device information;

information change means for changing said start-up status information in accordance with progress in start-up processing; and information retrieval and returning means acting upon receipt of a start-up status verification request from a host computer, said information retrieval and returning means thereupon retrieving said start-up status information and said parent device information from said storage means for transmission back to said host computer.

18. A peripheral device according to claim 17, wherein said host computer comprises:

request issuance means for issuing said status verification request to said peripheral device before issuing said start-up processing request to said peripheral device; and analysis means for analyzing the start-up status identification information included in said return data transmitted from said peripheral device in response to said status verification request, said start-up status identification information indicating the status of start-up processing execution of said peripheral device.

19. A peripheral device according to claim 18, wherein said host computer issues another start-up request to said peripheral device when said peripheral device has yet to perform start-up processing, and suppresses the issue of any start-up processing request when said peripheral device has completed the start-up processing.

20. A peripheral device according to claim 19, wherein said return data includes parent device identification information for identifying the host computer which has issued said start-up processing request, and wherein said host computer further comprises:

judgment means for judging, when analysis by said analysis means reveals that said peripheral device is performing start-up processing, whether the host computer which has issued said start-up processing request is said host computer; and request issuance means for issuing, when judgment by said judgment means shows that the host computer which has issued said start-up processing request is said host computer, said start-up processing request after resetting said peripheral device, said request issuance means further suppressing the issue of a start-up processing request when judgment by said judgment means reveals that the host computer which has issued said start-up processing request is not said host computer.

* * * * *